(12) United States Patent
Corbett

(10) Patent No.: US 10,741,100 B2
(45) Date of Patent: *Aug. 11, 2020

(54) RECONFIGURABLE LABEL ASSEMBLY

(71) Applicant: Dawg'N Around, LLC, Newtown, PA (US)

(72) Inventor: Lee M. Corbett, Whippany, NJ (US)

(73) Assignee: Dawg'N Around, LLC, Newtown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/220,185

(22) Filed: Dec. 14, 2018

(65) Prior Publication Data

US 2019/0122587 A1 Apr. 25, 2019

Related U.S. Application Data

(60) Continuation of application No. 15/421,885, filed on Feb. 1, 2017, now Pat. No. 10,192,466, which is a
(Continued)

(51) Int. Cl.
*G09F 3/02* (2006.01)
*B65D 23/14* (2006.01)
(Continued)

(52) U.S. Cl.
CPC ............... *G09F 3/02* (2013.01); *A01K 7/005* (2013.01); *B65D 5/40* (2013.01); *B65D 23/0842* (2013.01);
(Continued)

(58) Field of Classification Search
CPC ... B65D 3/06; B65D 3/20; B65D 3/40; B65D 5/40; B65D 23/14; B65D 25/20;
(Continued)

(56) References Cited

U.S. PATENT DOCUMENTS 1,618,724 A * 2/1927 Pearson ................. B65D 23/12
215/391
1,850,369 A * 3/1932 Andrews ................... G09F 3/18
40/310
(Continued)

*Primary Examiner* — Bryon P Gehman
(74) *Attorney, Agent, or Firm* — Michael Crilly, Esquire

(57) ABSTRACT

An improved reconfigurable label assembly is presented. The assembly includes a container, a front panel, a back panel, a bottom panel, and an optional pair of attachment elements. The bottom panel is disposed between and substantially parallel to the front and back panels in a first configuration to form a label attached to and completely separable from the container. The label is disposed along an outer surface of the container in the first configuration and is configurable to form a receptacle in a second configuration. The front and back panels are separable and the bottom panel is expandable to form the receptacle after the label is removed from the container. The receptacle is capable of holding a consumable product. The receptacle is reconfigurable to the label after use as the receptacle so that the label may be directly reattached to the container. The optional attachment elements cooperate to releasably secure the front, back, and bottom panels to the container in the first configuration.

9 Claims, 18 Drawing Sheets

Related U.S. Application Data continuation-in-part of application No. 15/177,399, filed on Jun. 9, 2016, now Pat. No. 9,601,035, which is a division of application No. 14/419,537, filed as application No. PCT/US2013/051568 on Jul. 23, 2013, now Pat. No. 9,390,633.

(60) Provisional application No. 61/729,441, filed on Nov. 23, 2012, provisional application No. 61/680,300, filed on Aug. 7, 2012.

(51) Int. Cl.

| | | |
|---|---|---|
| *A01K 7/00* | (2006.01) | |
| *B65D 23/08* | (2006.01) | |
| *B65D 25/20* | (2006.01) | |
| *B65D 81/36* | (2006.01) | |
| *B65D 5/40* | (2006.01) | |
| *G09F 3/00* | (2006.01) | |

(52) U.S. Cl.
CPC ............ *B65D 23/14* (2013.01); *B65D 25/20* (2013.01); *B65D 25/205* (2013.01); *B65D 81/365* (2013.01); *G09F 3/0288* (2013.01); *B65D 2203/02* (2013.01); *G09F 2003/0272* (2013.01); *G09F 2003/0273* (2013.01)

(58) Field of Classification Search
CPC .... B65D 25/205; B65D 81/36; B65D 81/365; B65D 2203/02; B65D 23/08; B65D 23/0842; G09F 3/02; G09F 3/0288; G09F 2003/272; G09F 2003/273; A01K 7/005
See application file for complete search history.

(56) References Cited

U.S. PATENT DOCUMENTS

| | | | | |
|---|---|---|---|---|
| 3,120,918 | A * | 2/1964 | Leonard | B65D 5/46032 383/14 |
| 3,430,844 | A * | 3/1969 | Daniels | B65D 31/142 383/54 |
| 4,353,476 | A * | 10/1982 | Cowgill | B44D 3/123 206/216 |
| 4,387,804 | A * | 6/1983 | Austin | A61J 1/035 206/217 |
| 4,898,477 | A * | 2/1990 | Cox | B65D 33/007 383/104 |
| 5,630,544 | A * | 5/1997 | Shane | B65D 31/12 229/114 |
| 6,153,279 | A * | 11/2000 | Charley | G09F 3/02 283/101 |
| 6,250,005 | B1 * | 6/2001 | Richards | B65D 25/36 150/901 |
| 6,508,904 | B1 * | 1/2003 | Charley | G09F 3/02 156/249 |
| 7,021,594 | B2 * | 4/2006 | Exler | A47G 23/0225 248/205.2 |
| 7,360,256 | B1 * | 4/2008 | Jiles | A41B 13/10 2/48 |
| 8,065,826 | B2 * | 11/2011 | Riis | B65D 23/085 215/DIG. 7 |
| 2002/0066413 | A1 * | 6/2002 | Prezant | A01K 5/0114 119/61.57 |
| 2009/0295141 | A1 * | 12/2009 | Herbst et al. | B65D 25/205 283/70 |
| 2010/0025456 | A1 * | 2/2010 | McCann | B65D 31/142 229/117.06 |
| 2012/0132557 | A1 * | 5/2012 | Nowzari | B65D 23/085 206/459.5 |
| 2013/0048827 | A1 * | 2/2013 | Meier et al. | A47G 19/2227 248/682 |

* cited by examiner

RECONFIGURABLE LABEL ASSEMBLY

CROSS REFERENCE TO RELATED APPLICATIONS

This application is a continuation application of U.S. patent application Ser. No. 15/421,885 entitled Reconfigurable Label Assembly for use with a Pet filed Feb. 1, 2017 which is a continuation-in-part of U.S. patent application Ser. No. 15/177,399 entitled Reconfigurable Label Assembly filed Jun. 9, 2016 now U.S. Pat. No. 9,601,035 which is a divisional application of U.S. National Phase application Ser. No. 14/419,537 entitled Reconfigurable Label Assembly and Container filed Feb. 4, 2015 now U.S. Pat. No. 9,390,633 which is based upon and claims priority from Patent Cooperation Treaty Application No. PCT/US2013/051568 entitled Reconfigurable Label Assembly filed Jul. 23, 2013 which further claims priority from U.S. Provisional Application Nos. 61/729,441 filed Nov. 23, 2012 and 61/680,300 filed Aug. 7, 2012, both entitled Reconfigurable Label. The subject matters of the prior applications are incorporated in their entirety herein by reference thereto.

FEDERALLY SPONSORED RESEARCH AND DEVELOPMENT

None.

BACKGROUND OF THE INVENTION

1. Field of the Invention

The invention generally relates to a label for use with a container containing a consumable product, namely, food or drink. Specifically, the invention is a label in a first configuration disposed along a container in a removable fashion that is configurable to a leak-proof receptacle in a second configuration, non-limiting examples including a cup or a bowl, capable of holding the consumable product dispensed from the container into the receptacle. The label is multiply transformable between the two configurations.

2. Background

The embodiments described in U.S. Pat. No. 9,390,633 entitled Reconfigurable Label Assembly and Container include a label removably securable to a container. The label is configurable between label and receptacle forms. The securing means between label and container may further include an adhesive. After the label is removed from the container, the adhesive may remain along the label and/or container. In some applications, the exposed adhesive may attract dirt and debris or create a nuisance whereby label and/or container adhere(s) to objects that contact the adhesive. Therefore, it would be advantageous to include another means for removably securing a dual-purpose label to a container while preserving reattachment functionality.

In one example, a means other than an adhesive may be advantageous as the primary means for securing and/or re-securing a dual-function label to a container.

In another example, a means other than adhesive may be advantageous as a secondary or optional means for securing and/or re-securing a dual-function label to a container. In the latter applications, the secondary/optional means may be used with or complement an adhesive means for attaching a label to a container.

Accordingly, what is required is a reconfigurable label assembly including a non-adhesive means for attaching and reattaching a label to a container wherein the label in a first configuration is transformable to a receptacle in a second configuration.

SUMMARY OF THE INVENTION

An object of the invention is a reconfigurable label assembly including a non-adhesive means for attaching and reattaching a label to a container wherein the label in a first configuration is transformable to a receptacle in a second configuration.

In accordance with embodiments of the invention, an improved reconfigurable label assembly includes a container, a front panel, a back panel, a bottom panel, and an optional pair of attachment elements. The front, back, and bottom panels are attached. The bottom panel is disposed between and substantially parallel to the front and back panels in a first configuration to form a label attached to and completely separable from the container. The label is disposed along an outer surface of the container in the first configuration and is configurable to form a receptacle in a second configuration. The front and back panels are separable and the bottom panel is expandable to form the receptacle in the second configuration after the label is removed from the container. The receptacle is capable of holding the consumable product. The receptacle in the second configuration is configurable to the label in the first configuration after use as the receptacle in the second configuration so that the label in the first configuration is directly reattachable to the container. The optional attachment elements are separately disposed at opposite ends of the label in the first configuration. The attachment elements cooperate to releasably secure the front, back, and bottom panels to the container in the first configuration.

In accordance with other embodiments of the invention, one attachment element is disposed along a first side seam and another attachment element is disposed along a second side seam. The first and second side seams overlap when the label is disposed about the container.

In accordance with other embodiments of the invention, the attachment elements are magnetic.

In accordance with other embodiments of the invention, one attachment element is magnetic and another attachment element is magnetically attractable.

In accordance with other embodiments of the invention, the attachment elements comprise a hook-n-loop fastener.

In accordance with other embodiments of the invention, the attachment elements comprise a first slot disposed along a first side seam and a second slot disposed along a second side seam. The slots permit mechanical interlock between the first side seam and the second side seam.

In accordance with other embodiments of the invention, the attachment elements facilitate attachment of the front, back, and bottom panels to the container in the first configuration.

In accordance with other embodiments of the invention, the attachment elements facilitate reattachment of the front, back, and bottom panels to the container in the first configuration.

In accordance with embodiments of the invention, a method for using an improved reconfigurable label assembly includes the steps of removing a label from a container in a first configuration, configuring the label to a receptacle in a second configuration, and reconfiguring the receptacle to the label. The label includes a front panel, a back panel and a bottom panel disposed in a substantially parallel arrangement. The container includes a consumable pet product. In the configuring step, the front and back panels are separated and the bottom panel is expanded to form the receptacle. The receptacle is capable of holding the consumable pet product. In the reconfiguring step, the front, back, and bottom panels are once again disposed in a substantially parallel arrangement.

In accordance with other embodiments of the invention, the method further includes dispensing the consumable pet product from the container into the receptacle between configuring and reconfiguring steps and permitting a pet to consume the consumable pet product from the container after dispensing step.

In accordance with other embodiments of the invention, the method further includes reattaching the label to the container after the reconfiguring step.

In accordance with other embodiments of the invention, the removing step further includes separating a pair of attachment elements disposed at opposite ends of the label.

In accordance with other embodiments of the invention, the reattaching step includes joining a pair of attachment elements disposed at opposite ends of the label.

In accordance with other embodiments of the invention, the attachment elements are magnetically operable.

In accordance with other embodiments of the invention, the attachment elements are hook-n-loop operable.

In accordance with other embodiments of the invention, the attachment elements are operable via a pair of slots separately disposed along a first side seam and a second side seam thereby permitting mechanical engagement between the first and second side seams.

Several advantages are offered by the invention. The invention is applicable to and compatible with a variety of containers examples including but not limited to containers composed of cardboard, glass, metal, and composite. The attachment elements facilitate a primary means for securing and re-securing a dual-function label to a container. The attachment elements facilitate a secondary or option means for securing and re-securing a dual-function label to a container.

The above and other objectives, features, and advantages of the preferred embodiments of the invention will become apparent from the following description read in connection with the accompanying drawings, in which like reference numerals designate the same or similar elements.

BRIEF DESCRIPTION OF THE DRAWINGS

Additional aspects, features, and advantages of the invention will be understood and will become more readily apparent when the invention is considered in the light of the following description made in conjunction with the accompanying drawings.

FIG. 22b is an enlarged side view illustrating an attachment element disposed along and fixed to an inward facing surface of the first side seam in FIG. 22a.

FIG. 22c is an enlarged side view illustrating an attachment element disposed along and fixed to an outward facing surface of the second side seam in FIG. 22a.

FIG. 25b is a top view further illustrating overlap between the first and second side seams in FIG. 25a.

FIG. 25c is a bottom plan view further illustrating overlap between the first and second side seams in FIG. 25a.

DETAILED DESCRIPTION OF THE INVENTION

Figure 1:
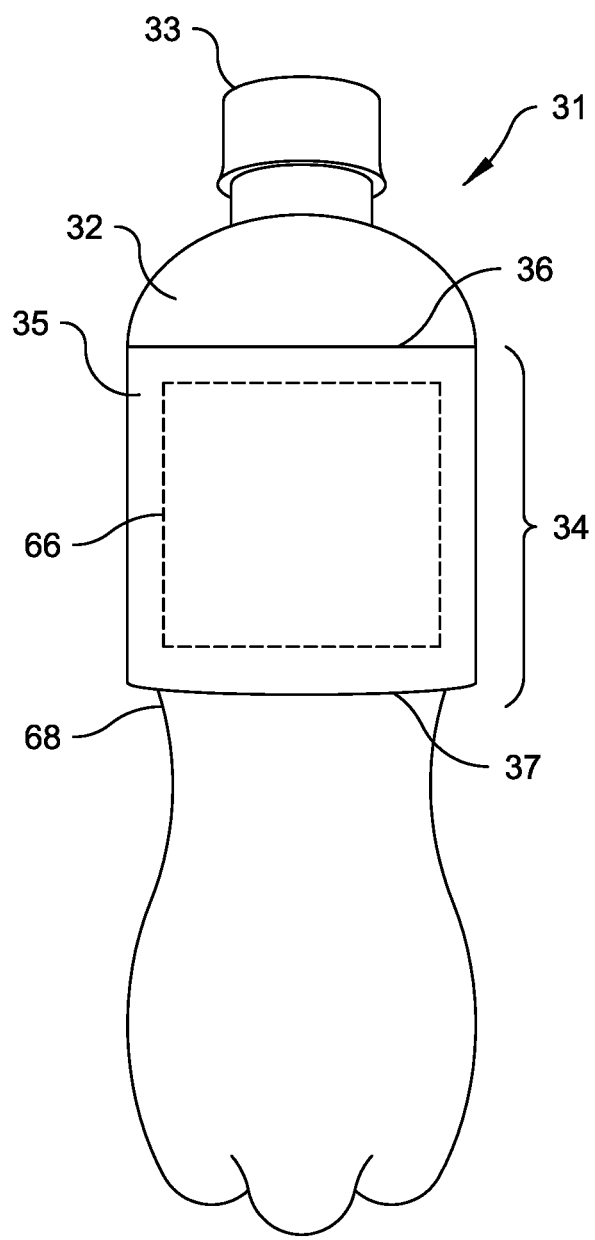
FIG. 1 is a side view illustrating a reconfigurable label assembly whereby a label in a first configuration is attached in a removable fashion about a circumference of a container in accordance with an embodiment of the invention.

Reference will now be made in detail to several embodiments of the invention that are illustrated in the accompanying drawings. Wherever possible, same or similar reference numerals are used in the drawings and the description to refer to the same or like parts. The drawings are in simplified form and are not to precise scale.

While features of various embodiments are separately described throughout this document, it is understood that two or more such features may be combined into a single embodiment.

Figure 2:
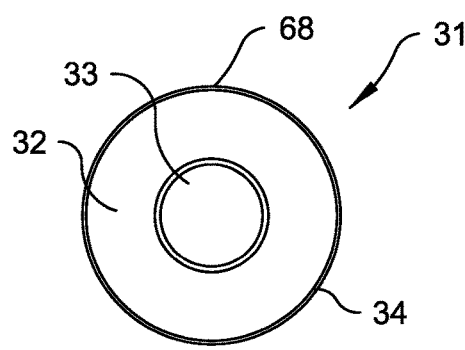
FIG. 2 is a top view illustrating a reconfigurable label assembly whereby a label in a first configuration is attached in a removable fashion about a circumference of a container in accordance with an embodiment of the invention.

Referring now to FIGS. 1 and 2, the reconfigurable label assembly 31 is illustrated including a container 32 with an optional cap 33 and a label 34. The container 32 may be any device capable of holding and storing a consumable product in liquid, solid, or liquid/solid form, non-limiting examples including food and drink for pets. The container 32 may be composed of a deformable or rigid material, non-limiting examples including soft plastics, hard plastics, glass, metal, or composites. The label 34 may be an element of sheet wise construction which is bendable, flexible, or pliable so as to conformably contact the outer surface of the container 32. For example, the label 34 may conform to the circumference 68 or perimeter of a container 32 so as to cover a portion of the center region of the container 32 as represented in FIG. 1 or the label 34 may substantially cover the container 32 in other embodiments. The label 34 may further include indicia 66 (generally represented by the region identified by reference numeral 66) completely or partially covering the front panel 35 of the label 34 between the top edge 36 and bottom edge 37 of the label 34, as represented in FIG. 1. The indicia 66 may include words, designs, pictures, bar coding, and/or any item which visually communicates information to an observer or a device held by an observer. In one example, indicia 66 may include product related information, designs, and/or trademarks. In another example, indicia 66 may include instructional information pertaining to the label 34 and its use and reuse. In yet another example, indicia 66 may include a code which launches content viewable on a smartphone or the like. The label 34 may be fabricated via one or more materials which are impermeable. Preferably, materials may be recyclable and disposable. Exemplary materials include, but are not limited to, plastic, wax coated paper, and waterproof cardboard.

Figure 3B:
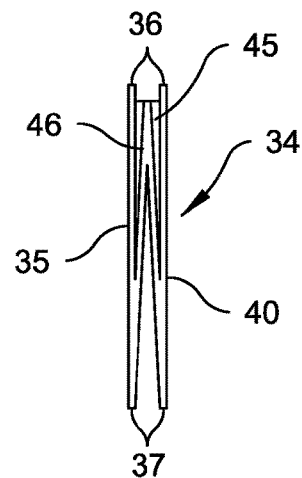
FIG. 3b is a side view illustrating the profile of a reconfigurable label in a first configuration in accordance with an embodiment of the invention.
Figure 3A:
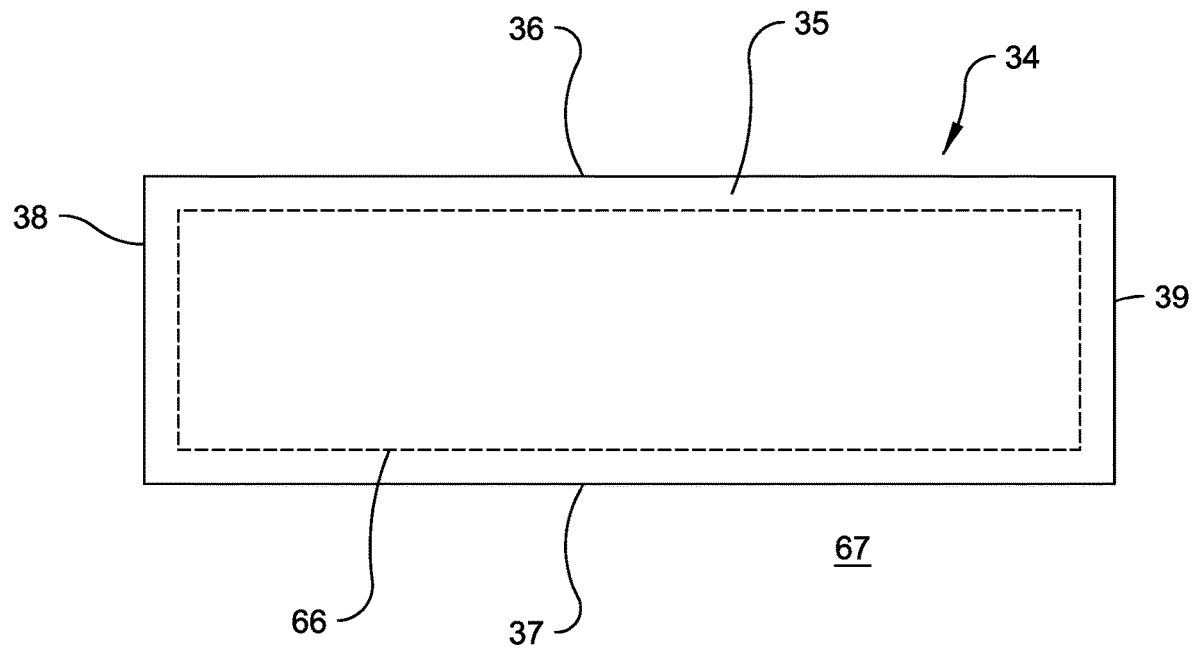
FIG. 3a is a front view illustrating a reconfigurable label in a first configuration disposed along a planar surface after removal from a container and prior to transformation into a receptacle in a second configuration in accordance with an embodiment of the invention.

Referring now to FIGS. 3a and 3b, an embodiment of a label 34 with indicia 66 is shown disposed along a planar surface 67 so that a front panel 35 is clearly visible and a back panel 40 contacts the planar surface 67. The label 34 is disposed in a collapsed configuration so that the front and back panels 35, 40 are disposed about a pair of side panels 45 and a bottom panel 46. The panels 35, 40, 45, 46 are closely spaced and substantially parallel so as to form a structure of nominal thickness, as represented in FIG. 3b, which minimizes extension of the label 34 from the container 32. In one non-limiting example, each panel 35, 40, 45, 46 may be 1 to 4 mils thick. The label 34 is bounded by a top edge 36, a bottom edge 37, and a pair of side edges 38, 39. The edges 36-39 generally define the area visible when the label 34 is attached to a container 32. Although a rectangular-shaped label 34 is illustrated in FIG. 3a, other shapes are possible.

Figure 4:
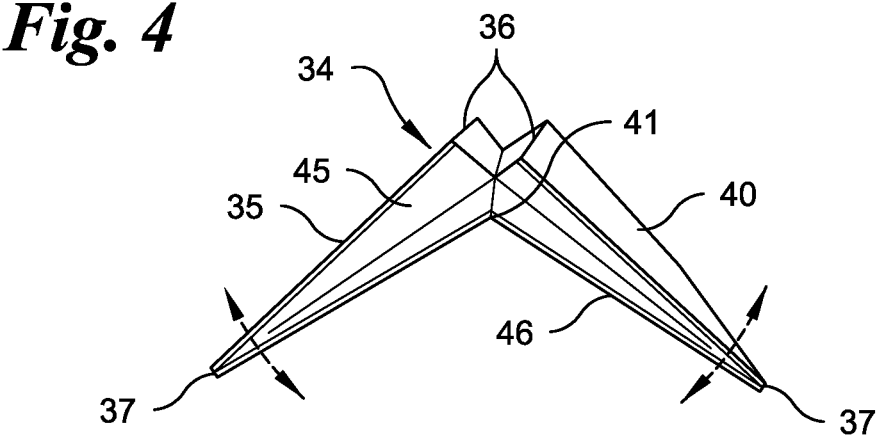
FIG. 4 is a side view illustrating a reconfigurable label partially unfolded during transformation to a receptacle in a second configuration in accordance with an embodiment of the invention.

Referring now to FIG. 4, a label 34 is partially unfolded by rotating the front and back panels 35, 40 away outward adjacent to the bottom edge 37, as illustrated by the arrows. This motion causes the bottom edges 37 to separate and the top edges 36 to move closer. The bottom panel 46 assumes a v-shaped arrangement pivoting about a fold 41 which traverses the length of the label 34, also see FIG. 5. The fold 41 is substantially parallel to the front and back panels 35, 40. The front and back panels 35, 40 are also slightly separated from the bottom panel 46 to display a side panel 45 in a substantially collapsed and folded condition. The label 34 is folded by moving the bottom edges 37 inward toward each other.

Figure 5:
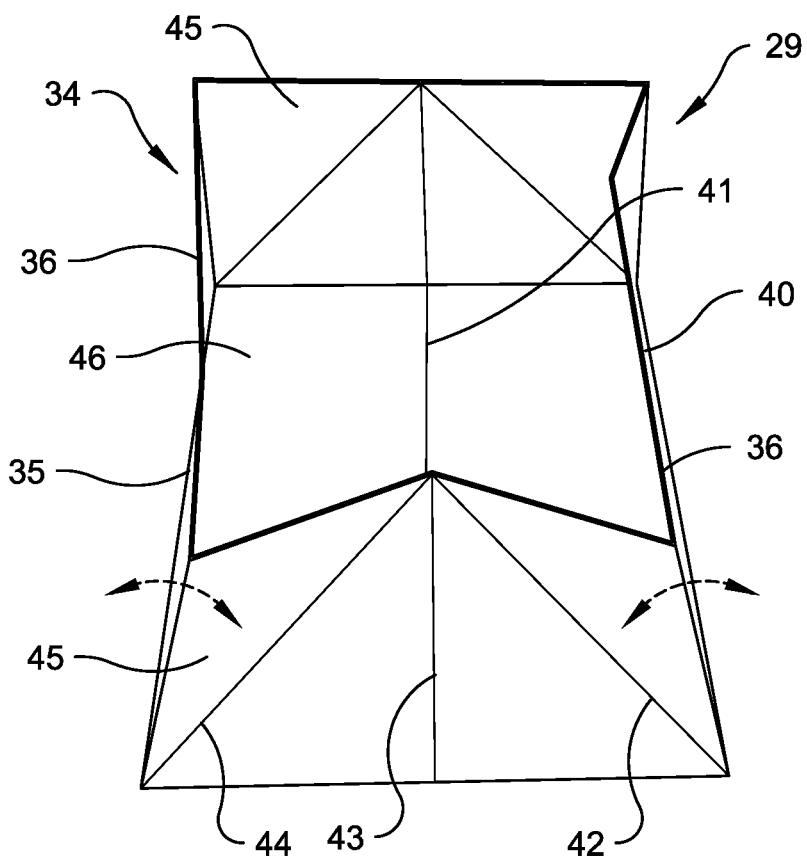
FIG. 5 is a side elevation view illustrating a reconfigurable label nearly completely unfolded during transformation into a receptacle in a second configuration in accordance with an embodiment of the invention.

Referring now to FIG. 5, a label 34 is nearly completely unfolded by further rotating the front and back panels 35, 40 away from each other adjacent to the top edge 36. The bottom panel 46 is nearly planar so that the fold 41 forms an obtuse angle approaching 180 degrees. The front and back panels 35, 40 are oriented nearly perpendicular relative to a planar surface. The side panels 45 are nearly completely unfolded. Each side panel 45 includes a fold 43 which traverses the height of the side panel 45 and intersects with the fold 41 along the bottom panel 46. Each side panel 45 also includes a pair of inclined folds 42, 44 which intersect the fold 43 at the top end of the side panel 45. The fold 44 also intersects the corner formed between the front panel 35 and the bottom panel 46. The fold 42 also intersects the bottom panel 46 and between the back panel 40 and the bottom panel 46. It is also possible to transform the label 34 into a receptacle 29 by separating the front and back panels 35, 40 which in turn cause relative rotation motion whereby the bottom panel 46 is expanded and the side panels 45 extended.

Referring again to FIG. 5, the side panels 45 unfold outward and refold inward along folds 42, 44. The bottom panel 46 unfolds downward and folds upward via the transverse fold 41. Folds 42, 44 and fold 41 are disposed in opposite directions. The side panels 45 unfold from and refold onto the bottom panel 46 via the fold 43. Folds 43, 41 overlap when configured as a label 34.

Figure 6:
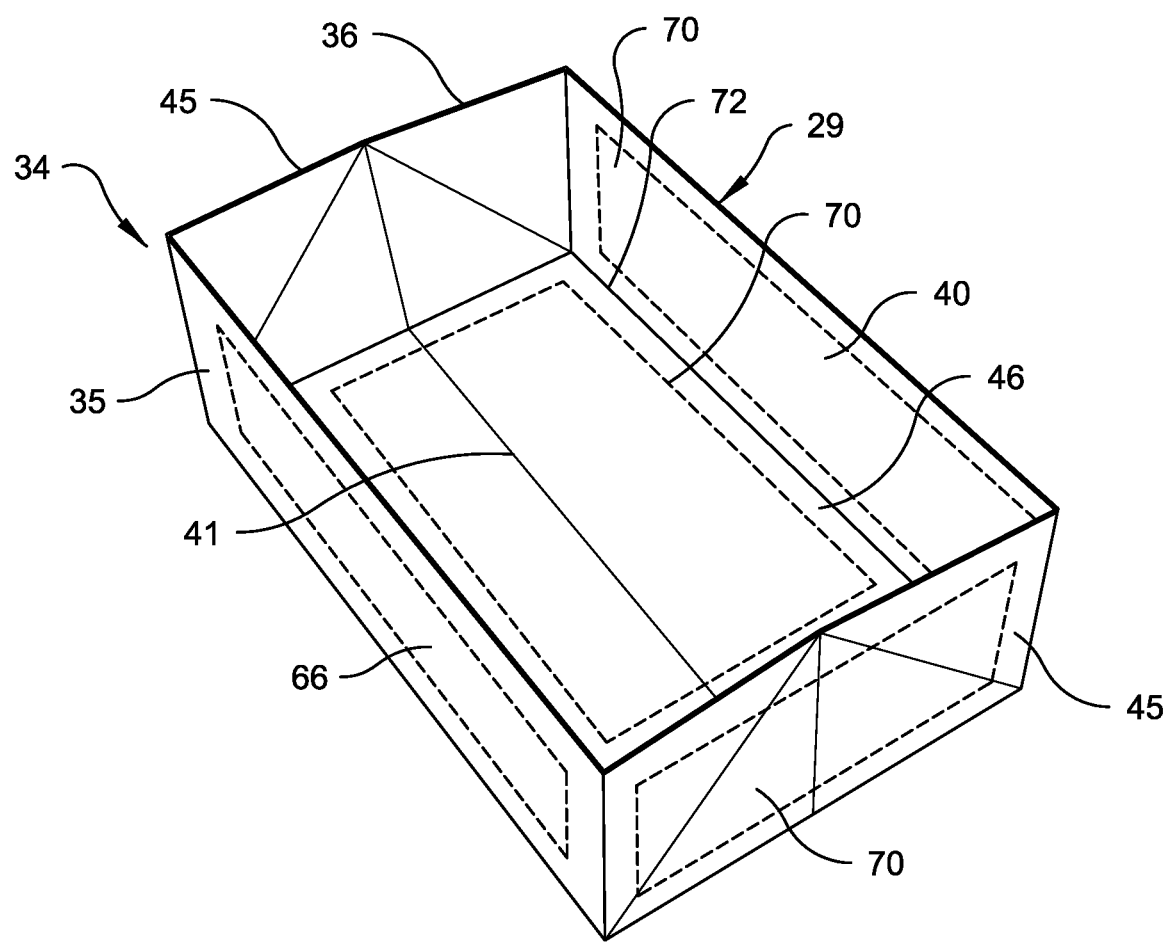
FIG. 6 is a perspective view illustrating a reconfigurable label fully unfolded to form a receptacle in a second configuration with a pair of side panels, a front panel, and a back panel attached to a bottom panel in accordance with an embodiment of the invention.

Referring now to FIG. 6, a label 34 is shown in a fully unfolded condition forming a receptacle 29 capable of holding a consumable product in a leak-proof manner. The front, back and side panels 35, 40, 45 are disposed in a substantially perpendicular arrangement with respect to the now substantially planar bottom panel 46. The front, back, and side panels 35, 40, 45 are attached to the bottom panel 46 about the perimeter 72. The front and back panels 35, 40 are attached at opposing ends to each of the side panels 45. Attachment between various panels 35, 40, 45, 46 is possible via molding, bonding, ultrasonic welding, forming, or other suitable methods. The indicia 66 along the front panel 35 are clearly visible. Additional indicia 70 (generally represented by the region identified by reference numeral 70) may be provided along the back, side, and/or bottom panels 40, 45, 46 as illustrated in FIG. 6.

Referring again to FIG. 6, the various panels 35, 40, 45, 46 are sufficiently rigid when unfolded so as to substantially maintain the desired shape of the receptacle 29. The shape and rigidity of the receptacle 29 is further ensured by the forces applied by a consumable product within the receptacle 29.

Figure 7:
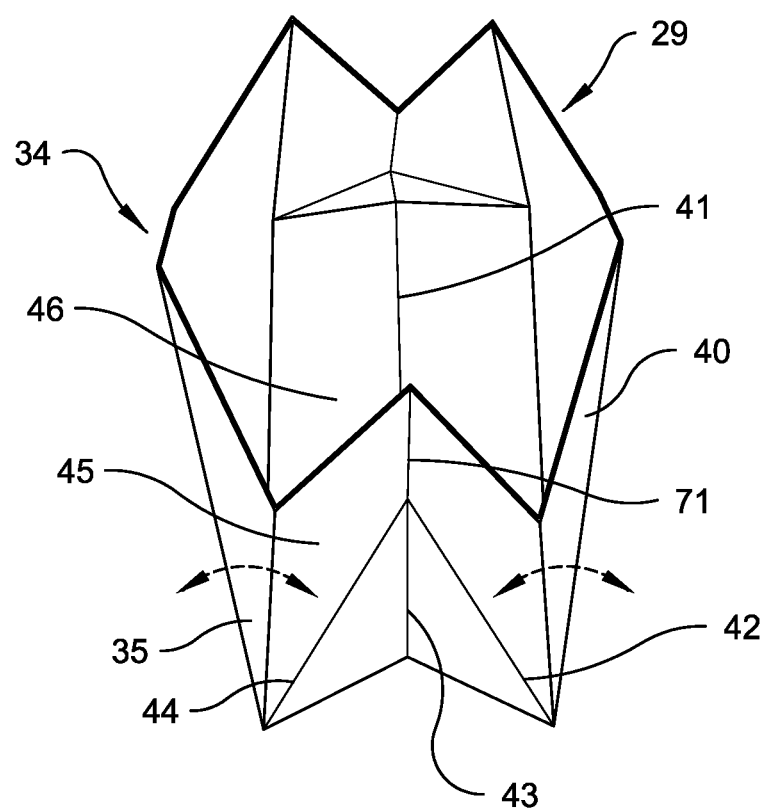
FIG. 7 is a side elevation view illustrating a reconfigurable label partially unfolded during transformation into a receptacle in a second configuration in accordance with an embodiment of the invention.

Referring now to FIG. 7, an alternate embodiment is illustrated for the side panels 45 of the label 34 configurable into a receptacle 29. A fold 71 is disposed along the side panel 45 so as to partially traverse the height of the side panel 45. The fold 71 is further disposed in a parallel arrangement with respect to the front and back panels 35, 40. Another fold 43 is disposed along the side panel 45 and collinear with the fold 71 so as to intersect the fold 71 at one end and the fold 41 at another end, the latter traversing the bottom panel 46. The folds 43, 71 are disposed in opposite directions. The folds 42, 44 are disposed in an inclined arrangement along the side panel 45. One end of the fold 44 intersects the point where the folds 43, 71 meet and another end intersects the corner formed between the front panel 35 and bottom panel 46. One end of the fold 42 intersects the point where folds 43, 71 meet and another end intersects the corner formed between the back panel 40 and bottom panel 46. Folds 43, 41 overlap when configured as a label 34. Folds 71, 42, 44 are foldable in the same direction and are oppositely foldable from the fold 43.

In this embodiment, the label 34 is unfolded by separating the front and back panels 35, 40 and folded by joining the front and back panels 35, 40, as illustrated by the arrows in FIG. 7. The side panels 45 unfold outward and fold inward along the folds 42, 43, 44, 71. The bottom panel 46 unfolds downward and folds upward via the transverse fold 41. A portion of the side panel 45 folds onto the bottom panel 46 via the fold 43 so that the folds 43, 41 overlap. The front, back, and side panels 35, 40, 45 are folded by moving the front and back panels 35, 40 toward one another, as illustrated by the arrows in FIG. 9.

Figure 8:
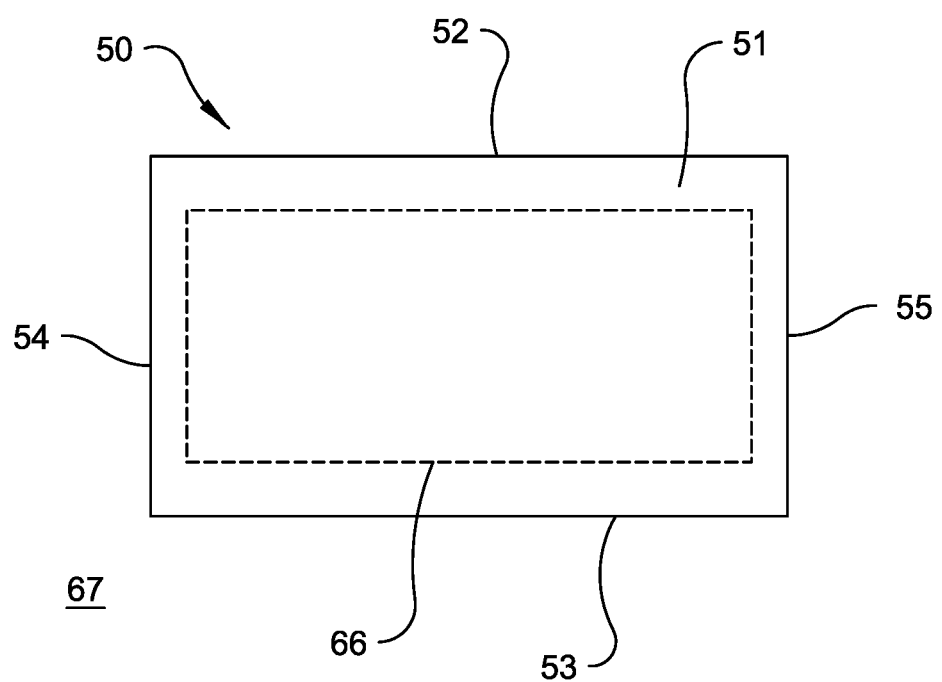
FIG. 8 is a front view illustrating a reconfigurable label disposed along a planar surface after removal from a container and prior to transformation into a receptacle in a second configuration in accordance with an embodiment of the invention.

Referring now to FIG. 8, the front panel 51 of an alternate label 50 is shown including a top edge 52, a bottom edge 53, a pair of side edges 54, 55 and optional indicia 66, as otherwise described herein, disposed along a planar surface 67.

Figure 9:
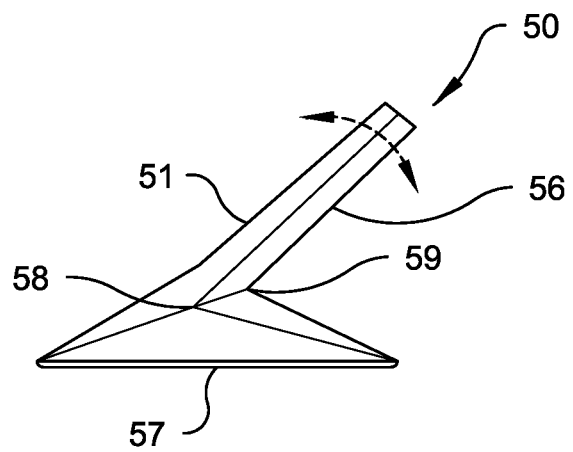
FIG. 9 is a side view illustrating a reconfigurable label partially unfolded during transformation to a receptacle in a second configuration in accordance with an embodiment of the invention.

Referring now to FIG. 9, the label 50 is shown in a partially unfolded condition. The front and bottom panels 51, 57 are substantially planar disposed elements. The back panel 56 includes a fold 59 which traverses the back panel 56 separating two substantially planar portions. This arrangement allows the back panel 56 to fold onto itself when configured for use as a label 50 so that the front and bottom panels 51, 57 are disposed in a substantially parallel arrangement about the back and side panels 56, 58.

Figure 10:
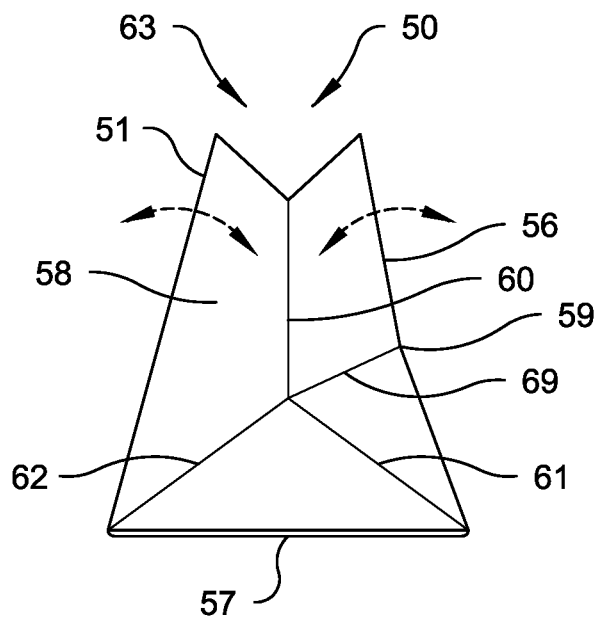
FIG. 10 is a side view illustrating a side panel of a reconfigurable label nearly completely unfolded during transformation into a receptacle in a second configuration in accordance with an embodiment of the invention.

Referring now to FIG. 10, the label 50 is shown in a substantially unfolded configuration for use as a leak-proof receptacle 63. Each side panel 58 includes a fold 60 which partially traverses the height of the side panel 58. Each side panel 58 also includes a pair of folds 61, 62 disposed at an incline. One fold 62 intersects the lower end of the fold 60 at a first end and intersects the corner formed between the front and bottom panels 51, 57 at a second end. The other fold 61 intersects the lower end of the fold 60 at a first end and intersects the corner formed between the back and bottom panels 56, 57 at a second end. A fourth fold 69 is provided along each side panel 58 so as to intersect the intersection of folds 60, 61, 62 at one end and intersect the fold 59 at the other end. Folds 60-62 are configured to collapse in a direct opposite from the fold 69.

Figure 11:
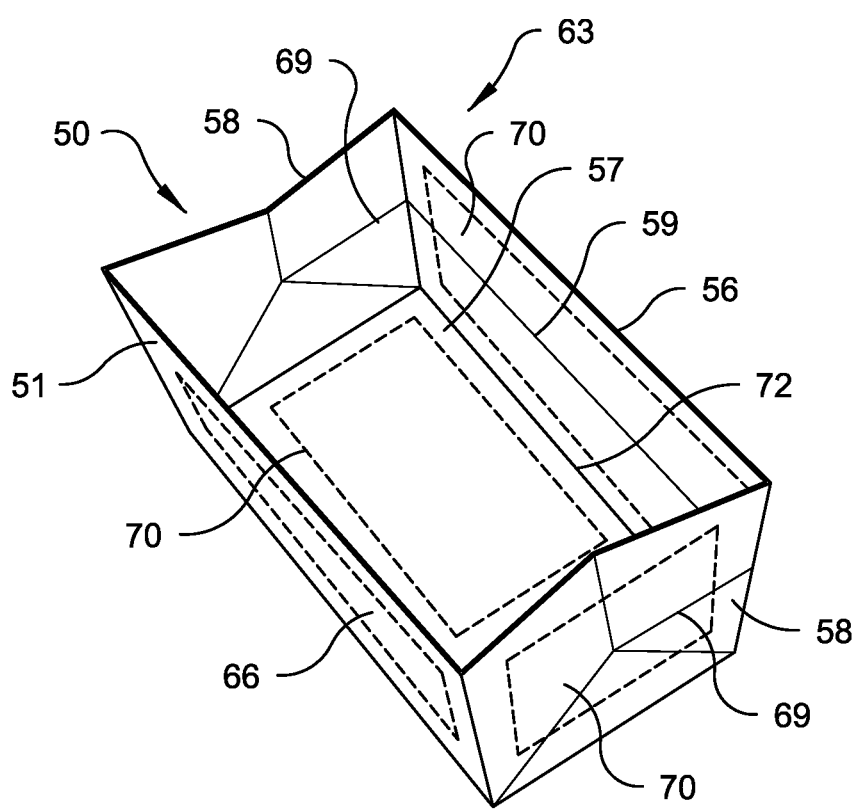
FIG. 11 is a perspective view illustrating a reconfigurable label fully unfolded to form a receptacle in a second configuration with a pair of side panels, a front panel, and a back panel attached to a bottom panel in accordance with an embodiment of the invention.

Referring now to FIG. 11, the label 50 is shown in a fully unfolded condition forming a receptacle 63 capable of holding a consumable product in a leak-proof manner. The front, back, and side panels 51, 56, 58 are disposed in a substantially perpendicular arrangement with respect to the now substantially planar bottom panel 57. The front, back, and side panels 51, 56, 58 are attached to the bottom panel 57 about the perimeter 72 of the bottom panel 57. The front and back panels 51, 56 are attached at opposing ends to each of the side panels 58. Attachment between various panels 51, 56, 57, 58 may be made via molding, bonding, ultrasonic welding, forming, or other suitable methods. The indicia 66 along the front panel 51 are clearly visible. Additional indicia 70 may be provided along the back, side, or bottom panels 56, 58, 57 as illustrated in FIG. 11.

Referring again to FIG. 11, the front, back, bottom, and side panels 51, 56, 57, 58 are sufficiently rigid when unfolded so as to substantially maintain the desired shape of the receptacle 63. The shape and rigidity of the receptacle 63 is further ensured by the forces applied by a consumable product within the receptacle 63.

In this embodiment, the label 50 is unfolded by rotating the back panel 56 away from itself as illustrated by the arrow in FIG. 9 and separating the front and back panels 51, 56 as illustrated by the arrows in FIG. 10. The side panels 58 fold inward and unfold outward via the folds 60, 61, 62, 69. Each back panel 56 folds onto and unfolds away or expands from itself via the fold 59. A portion of each side panel 58 folds onto the back panel 56 via overlap of the folds 59 and 69.

Figure 12:
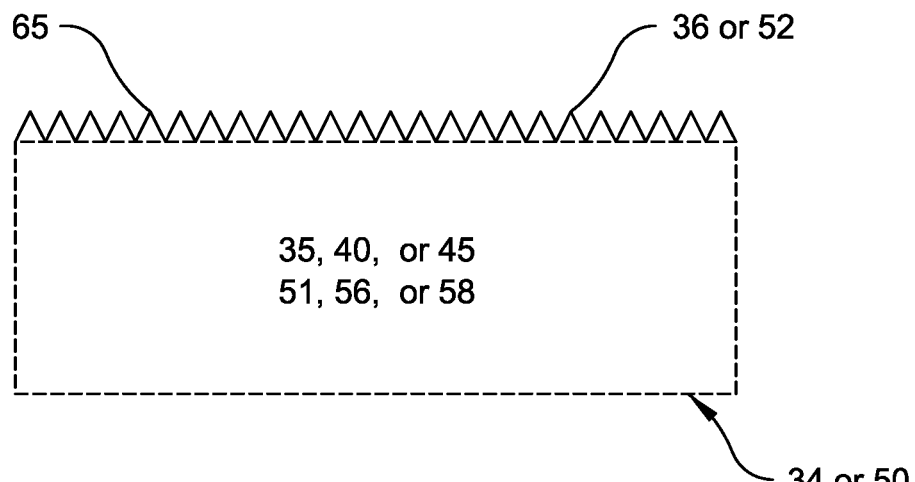
FIG. 12 is a side view illustrating a front, back or side panel along a receptacle in a second configuration with a scalloped edge in accordance with an embodiment of the invention.

Referring now to FIG. 12, one or more panels 35, 40, 45, 51, 56, 58, and/or others described herein may include a scalloped edge 65 or other non-linear feature along the top edge 36, 52 of the label 34, 50 to minimize cuts to a user which might result from a linear edge.

Figure 13:
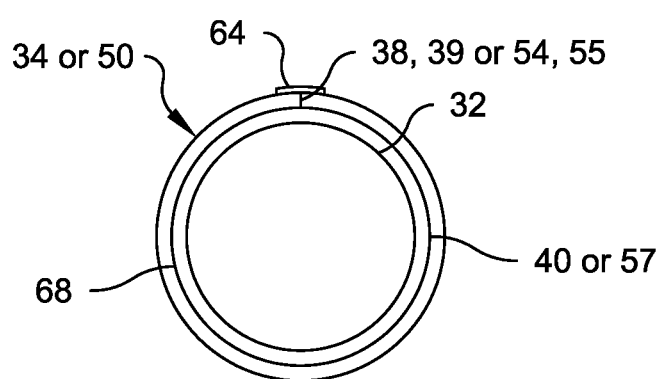
FIG. 13 is a cross section view through the circumference of a container illustrating attachment of a reconfigurable label in its fully collapsed form in a first configuration disposed about and attached to the outer circumference of a container in accordance with an embodiment of the invention.

The labels described herein are attachable in various configurations. In one example, a label 34, 50 and others described herein may completely surround the circumference 68 of a container 32 so that the side edges 38, 39 or 54, 55, respectively, abut, as represented in FIG. 13. In other embodiments, the side edges 38, 39 or 54, 55 may overlap or terminate so as to expose a portion of the container 32 between the side edges 38, 39 or 54, 55.

The various labels may be secured to a container 32 via several means. In one example, tape 64 may be applied to overlap the opposed side edges 38, 39 or 54, 55 of a label 34 or 50, respectively, as represented in FIG. 13. The label 34, 50 may be pulled tight onto the container 32 so that frictional forces secure the label 34, 50 to the container 32. In other embodiments, adhesive may be applied between the back panel 40 and container 32 or the bottom panel 57 and container 32. The back panel 40 contacts the container 32 with regard to the embodiments described in FIGS. 1-7. The bottom panel 57 contacts the container 32 with regard to the embodiments described in FIGS. 18-11. In yet other embodiments, an adhesive strip or tabs may secure overlapping side edges 38, 39 or 54, 55. In still other embodiments, the side edges 38, 39 or 54, 55 may include interlocking tabs or hook-like extensions which facilitate attachment of the label 34, 50 to a container 32.

Figure 14:
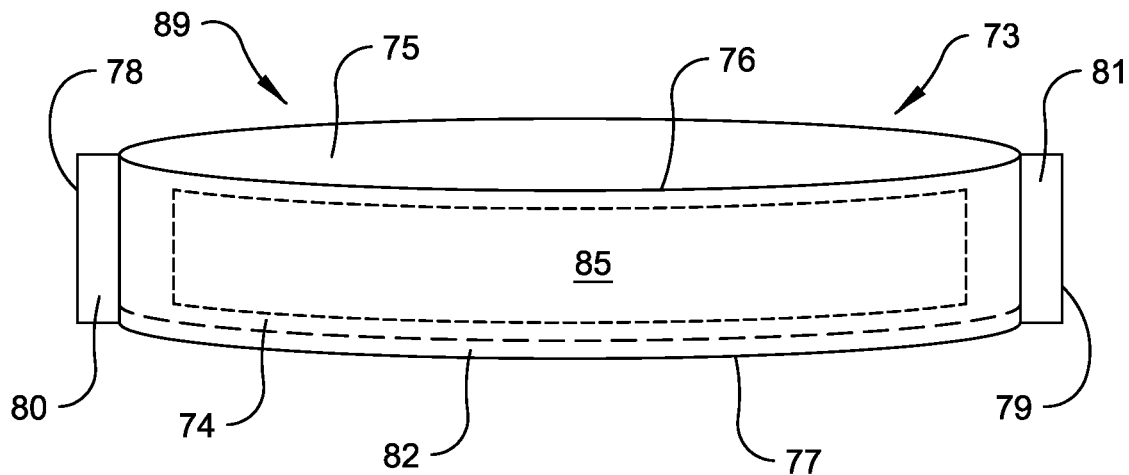
FIG. 14 is a top perspective view illustrating a reconfigurable label unfolded to form a receptacle in a second configuration including a front panel, a back panel, and a bottom panel in accordance with an embodiment of the invention.
Figure 15:
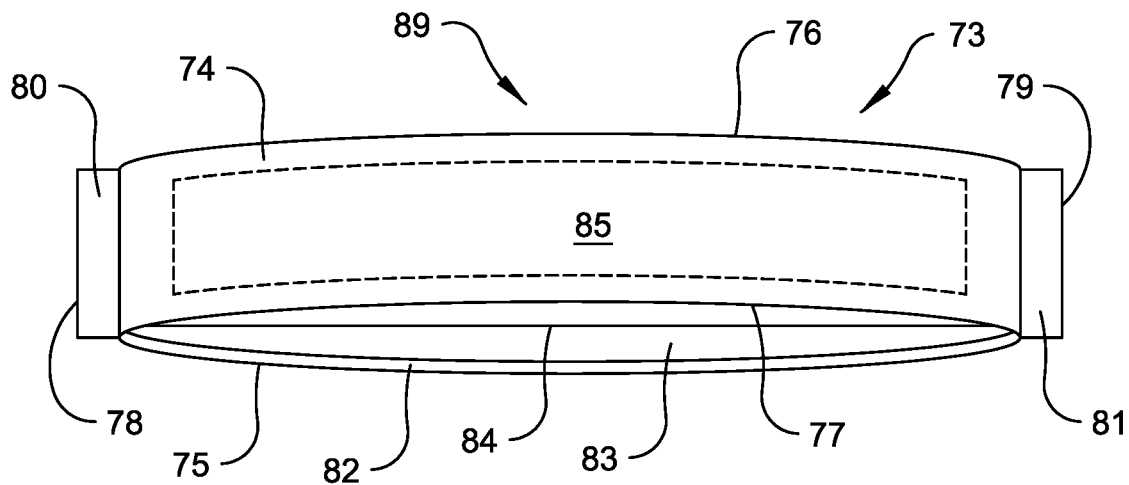
FIG. 15 is a bottom perspective view further illustrating the reconfigurable label in a second configuration as in FIG. 14.
Figure 16:
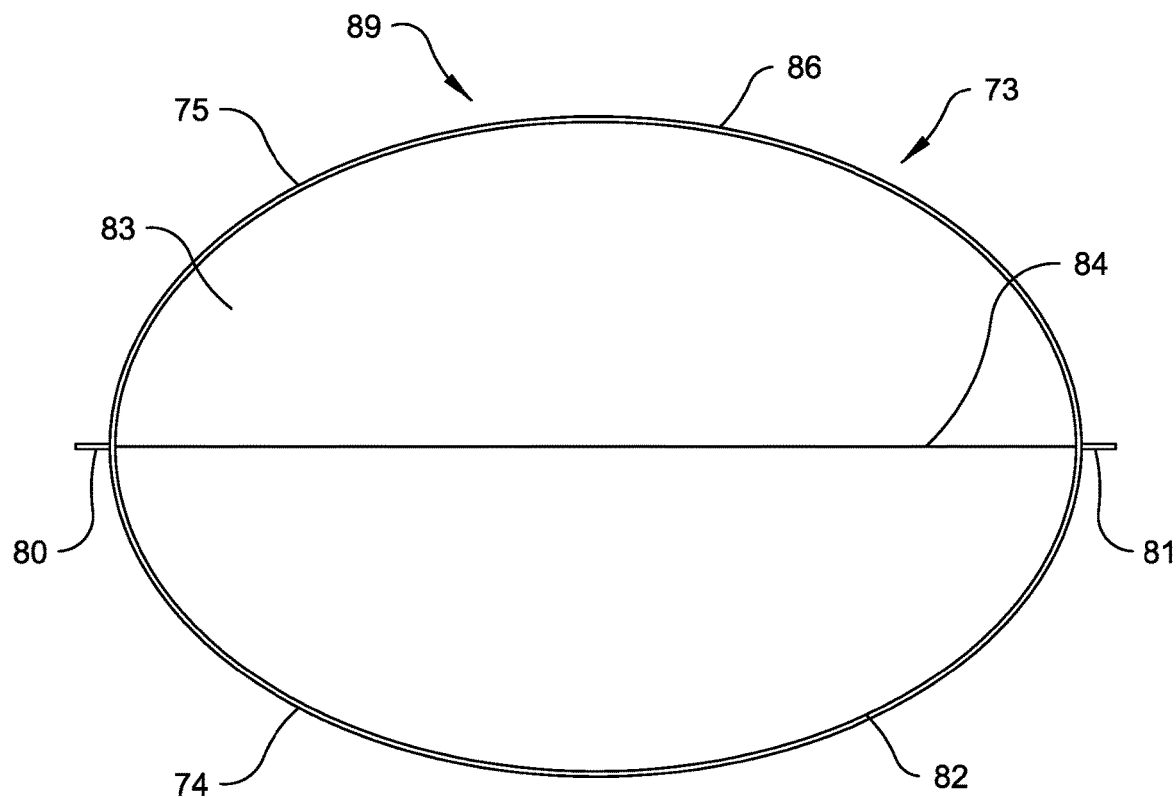
FIG. 16 is a top view illustrating a reconfigurable label fully unfolded in a second configuration so that a front panel and a back panel are disposed about the perimeter of a bottom panel thereby forming a receptacle capable of containing a consumable product without leakage in accordance with an embodiment of the invention.

Referring now to FIGS. 14 and 15, a label 73 is shown separate from a container 32 and expanded to form a receptacle 89, examples including but not limited to a bowl or cup, capable of holding a consumable product without leakage. The label 73 is attachable and reattachable to a container 32 as described for other embodiments. The label 73 includes a front panel 74 and a back panel 75 which form the sides of the receptacle 89. The front and back panels 74, 75 are generally rectangular-shaped elements, although other shapes are possible, composed of a bendable material preferably water resistant or waterproof, although not necessarily required for non-liquid consumable products. The label 73 further includes a bottom panel 83 which forms the bottom of the receptacle 89. The bottom panel 83 may be a circular or elliptical shaped element, although other shapes are possible, composed of a bendable material preferably water resistant or waterproof, although not necessarily required for non-liquid consumable products. The bottom panel 83 may cause the front and back panels 74, 75 to be generally arcuate when the label 73 is unfolded thereby defining the shape of the receptacle 89. The shape of the receptacle 89 is design dependent and generally defined by the shape of the bottom panel 83. The bottom panel 83 may further include a fold 84 which partially or completely traverses the width of the bottom panel 83. The back panel 75 contacts the container 32 with respect to the embodiments described in FIGS. 16-23c.

Figure 17:
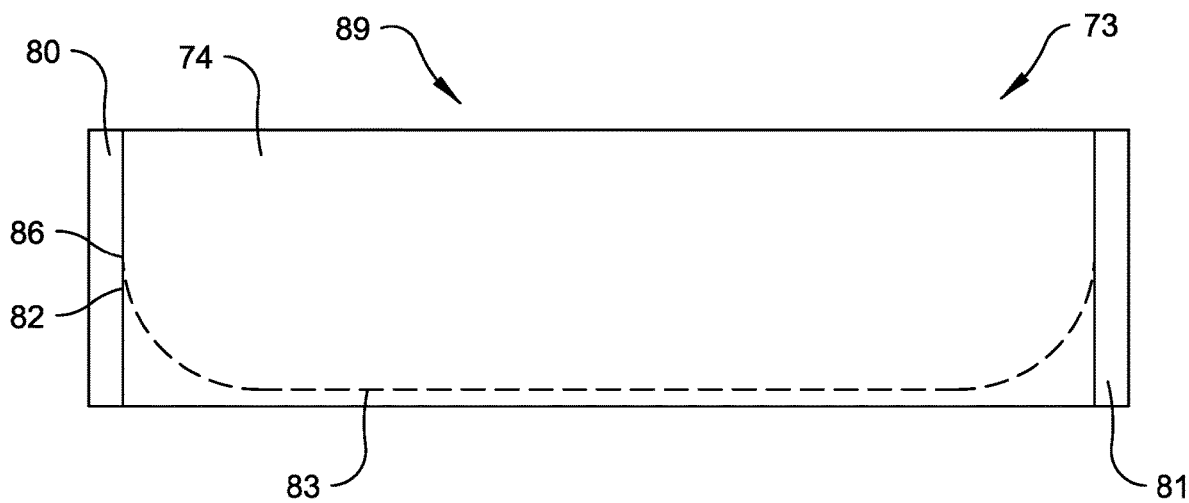
FIG. 17 is a side view of the reconfigurable label in a second configuration as in FIG. 14 illustrating arrangement of the bottom panel within the receptacle.

Referring now to FIGS. 14-17, the opposed side edges 78, 79 along the front panel 74 are aligned with and attached to likewise disposed side edges 78, 79 along the back panel 75. The leftmost overlapping side edges 78 of the front and back panels 74, 75 may be attached via an adhesive or ultrasonic weld to form a side seam 80, preferably forming a seal. The rightmost overlapping side edges 79 along the front and back panels 74, 75 may also be attached via an adhesive or ultrasonic weld to form a seam 81. Side seams 80, 81 are generally disposed along the length of the respective side edges 78, 79 where the front and back panels 74, 75 overlap and contact. The perimeter 86 of the bottom panel 83 contacts and overlaps the inner surface of the front and back panels 74, 75 adjacent to the bottom edges 77. The overlap may include a portion of the bottom panel 83 oriented upward or downward, the former shown in FIG. 21b, with a seam 82 formed along the overlap. The perimeter 86 may be attached to the front and back panels 74, 75 along the overlap via an adhesive or ultrasonic weld to form the seam 82. The bottom panel 83 may be disposed at a substantially horizontal arrangement that intersects the front and back panels 74, 75 so that the front and back panels 74, 75 extend above the bottom panel 83. In preferred embodiments, the bottom panel 83 intersects the front and back panels 74, 75 at a substantially perpendicular or oblique angle. The bottom panel 83 is biased toward the bottom edges 77 of the front and back panels 74, 75 and away from the top edges 76. In some embodiments, the bottom panel 83 may be attached to the front and back panels 74, 75 so that the bottom panel 83 and seam 82 are disposed in an inclined arrangement immediately adjacent to the side seams 80, 81, as represented in FIG. 17. The capacity of the receptacle 89 is defined approximately by the top edge 76, the bottom panel 83, and the perimeter 86 of the bottom panel 83 with adjustments for any inclines adjacent to the side edges 78, 79. The seams 80, 81, 82 ensure that the receptacle 89 formed by the front, back, and bottom panels 74, 75, 83 is capable of holding a consumable product without leakage.

In yet other embodiments, a rectangular-shaped bottom panel 83 may be folded lengthwise along the fold 84 and placed between rectangular-shaped front and back panels 74, 75. The bottom panel 83 may partially overlap the front and back panels 74, 75 starting at or near the bottom edges 77 with the fold 84 oriented toward the top edges 76. The front panel 74, back panel 75, and bottom panel 83 may be joined via side seams 80, 81 adjacent to side edges 78, 79, respectively. Approximately one half of the bottom panel 83 is joined to the front panel 74 and the remainder is joined to the back panel 75. The central and outer portions of one half of the bottom panel 83 may be ultrasonically welded to the front panel 74 adjacent to the bottom edge 77 along a seam 82. The outer portions may be welded along an angled orientation oriented upward and toward each side seam 80, 81. The central and outer portions of one half of the bottom panel 83 may be ultrasonically welded to the back panel 75 adjacent to the bottom edge 77 along a seam 82. The outer portions may be welded along an angled orientation upward and toward each side seam 80, 81. The seams 80, 81, 82 allow the front and back panels 74, 75 to be separated and the bottom panel 83 to unfold thereby forming a receptacle 89 whereby the bottom panel 83 is biased toward the bottom edge 77.

Figure 18:
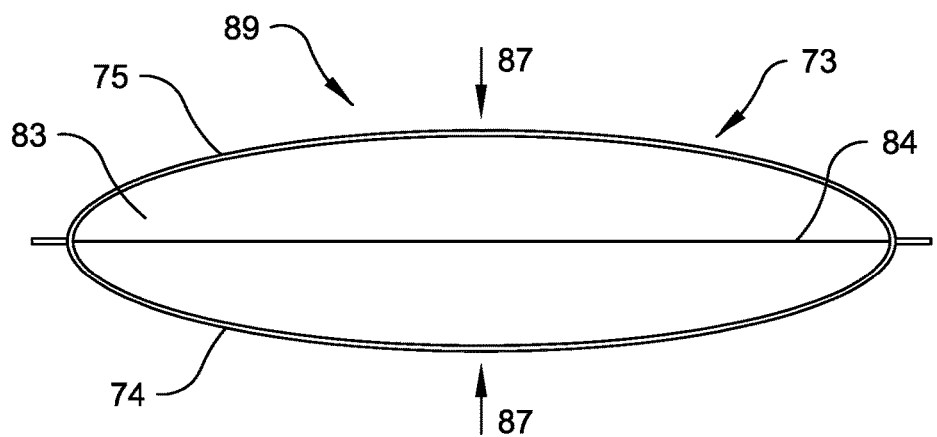
FIG. 18 is a top view illustrating a reconfigurable label partially collapsed in accordance with an embodiment of the invention.

Referring now to FIG. 18, the receptacle 89 is shown partially collapsed during reconfiguration as a label 73. The receptacle 89 is collapsed by applying an inward closing force 87 along the front and back panels 74, 75 in the direct of the fold 84. The fold 84 ensures that the bottom panel 83 folds generally half-wise and moves upward between the front and back panels 74, 75 when collapsed.

Figure 19:
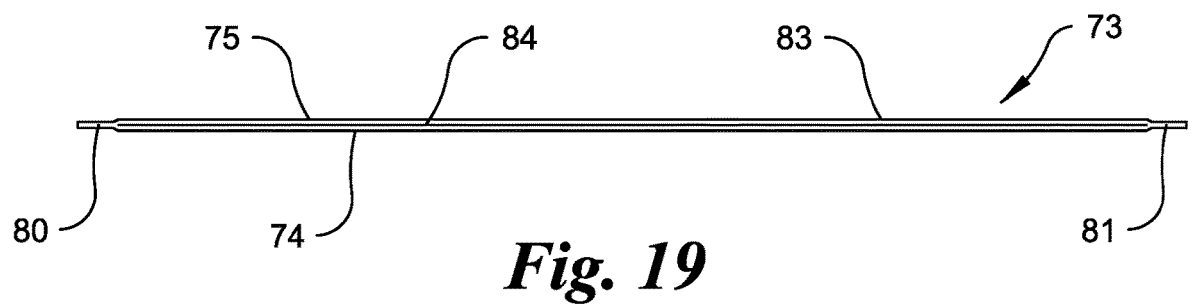
FIG. 19 is a top view illustrating a reconfigurable label fully collapsed in a first configuration so that a bottom panel is disposed in a parallel planar arrangement between front and back panels in accordance with an embodiment of the invention.
Figure 20:
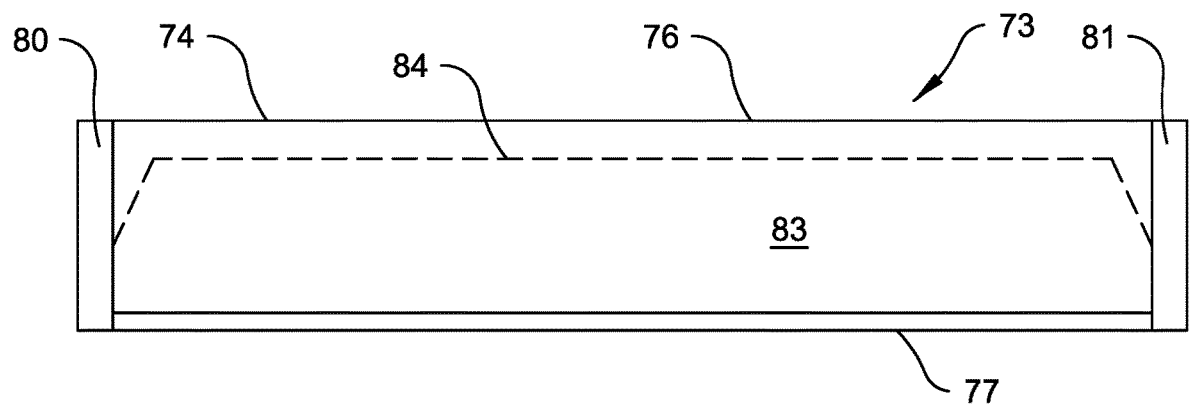
FIG. 20 is a side view of the reconfigurable label in a first configuration as in FIG. 19 illustrating the bottom panel in a folded arrangement along the length of the label.

Referring now to FIGS. 19 and 20, the label 73 is shown in its full collapsed condition. The label 73 is now substantially planar with a profile substantially equal to the rectangular shape of the front and back panels 74, 75, as represented in FIG. 20, and a thickness approximately equal to the sum of the thicknesses for the front panel 74, the back panel 75, and twice the bottom panel 83, as represented in FIG. 19. In one non-limiting example, each panel 74, 75, 83 may be 1 to 4 mils thick. The indicia 85 (generally represented by the region identified by reference numeral 85) shown along the front panel 74 in FIG. 14 would be clearly visible along the collapsed label 73. When fully collapse, the bottom panel 83 is folded in half and substantially parallel to the front and back panels 74, 75, as represented in FIG. 20, with the fold 84 oriented toward the top edge 76. The bottom panel 83 may partially or completely overlap the height of the front and back panels 74, 75, depending on the shape and dimensions of the bottom panel 83.

Figure 21A:
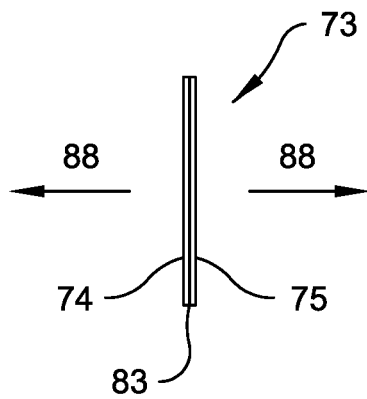
FIG. 21a is a cross section view illustrating a reconfigurable label collapsed to form a planar-shaped label in a first configuration in accordance with an embodiment of the invention.
Figure 21B:
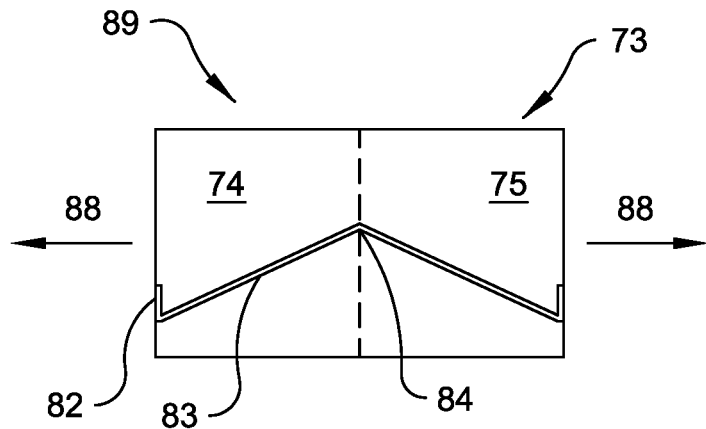
FIG. 21b is a cross section view of the reconfigurable label in FIG. 21a partially unfolded so that the bottom panel is partially expanded between the front and back panels.
Figure 21C:
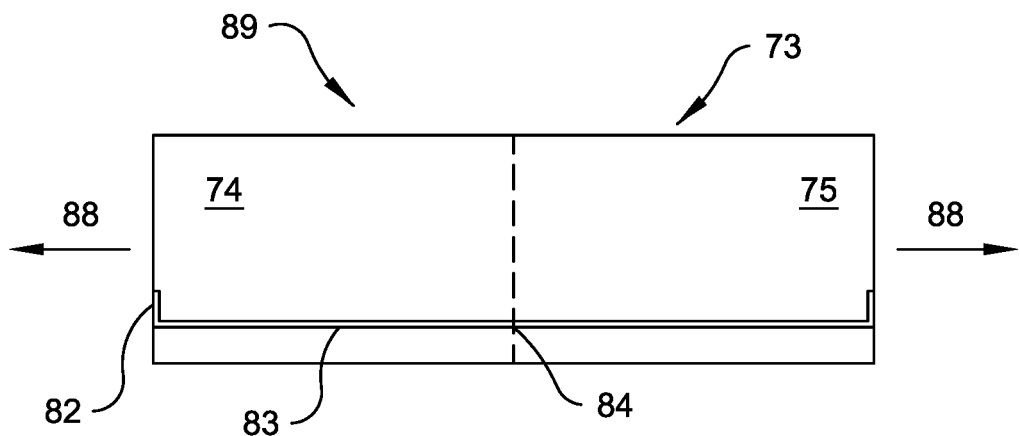
FIG. 21c is a cross section view of the reconfigurable label in FIG. 21a fully unfolded in a second configuration so that the bottom panel is completed expanded and horizontally disposed between the front and back panels so as to form a receptacle.

The label 73 is expanded to form a receptacle 89 by applying an outward opening force 88 onto the front and back panels 74, 75, as represented in FIG. 21a. The opening force 88 causes the front and back panels 74, 75 to separate from the bottom panel 83, as represented in FIG. 21b. The bottom panel 83 unfolds along the fold 84 as the distance between the front and back panels 74, 75 increases. When the front and back panels 74, 75 are completely separated, at least a portion of the bottom panel 83 may form a substantially horizontal element, as represented in FIG. 21c.

Referring now to FIGS. 14 and 22a-22c, the side seams 80, 81 may include attachment elements 99a, 99b for securing and/or re-securing a label 73 to a container 32 whereby the attachment elements 99a, 99b are components fixed to the side seams 80, 81. The first side seam 80 and the second side seam 81 generally extend from opposite ends of the receptacle 89. Each of the first side seam 80 and the second side seam 81 may be formed by an overlapped and joined arrangement between the front panel 74 and the back panel 75. The front panel 74 may be bonded to the back panel 75 via an adhesive, ultrasonic weld, or other means understood in the art. An attachment element 99a may be fixed along the inward facing surface 90 of the first side seam 80. An attachment element 99b may be fixed along the outward facing surface 91 of the second side seam 81. The attachment elements 99a, 99b may be secured to the respective side seams 80, 81 via an adhesive or other means understood in the art. The attachment elements 99a, 99b may either partially or completely traverse the respective side seams 80, 81 between top 92 and bottom 95, the latter shown in FIGS. 22b, 22c.

Referring again to FIGS. 22a-22c, each attachment element 99a, 99b is sized with respect to and positioned along the respective side seams 80, 81 so that the attachment elements 99a, 99b at least partially contact when the side seams 80, 81 at least partially overlap. The attachment elements 99a, 99b are oriented either to directly or indirectly engage thereby securing the side seams 80, 81 in a non-permanent fashion so that the side seams 80, 81 remain separable. The side seams 80, 81 may be removably securable via the attachment elements 99a, 99b when front panel 74, back panel 75, and bottom panel 83 are disposed in a substantially parallel and collapsed arrangement, otherwise representative of the label 73 in the first configuration shown in FIG. 19. When the side seams 80, 81 are removable secured, the label 73 generally forms a closed shape that surrounds and conforms to the perimeter of the container 32 onto which the label 73 is applied.

Referring again to FIGS. 22a-22c, each attachment elements 99a, 99b is generally understood to include at least two components that in combination facilitate releasably secured contact between the side seams 80, 81. In one example, the attachment elements 99a, 99b may include a pair of magnets separately disposed along the respective side seams 80, 81 so that the attractive forces magnetically engage and pull the side seams 80, 81 together. In another example, one attachment element 99a may be a magnet and another attachment element 99b may be a magnetically-attractable material separately disposed along the side seams 80, 81 so that the attractive force of the magnet engages the magnetically-attractable material thereby pulling the side seams 80, 81 together. The magnetically-attractable material may include, but is not limited to, ferrous metals in strip or foil form. In yet another example, one attachment element 99a may include hooks and another attachment element 99b may include loops which facilitate mechanical interlock when the attachments elements 99a, 99b contact. One specific example of attachment elements 99a, 99b with hook-n-loop operability is the product sold under the trademark VELCRO® owned by Velcro Industries B.V. located in Curacao, The Netherlands Antilles.

Figure 22A:
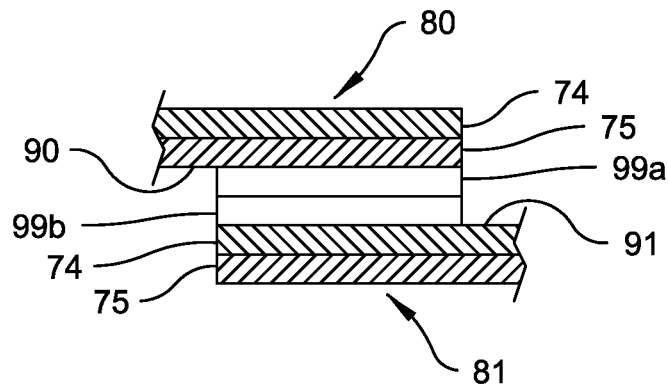
FIG. 22a is an enlarged cross section view illustrating a pair of attachment elements disposed between a first side seam and a second side seam whereby the attachment elements directly contact and removably secure the first and second side seams in accordance with an embodiment of the invention.
Figure 22B:
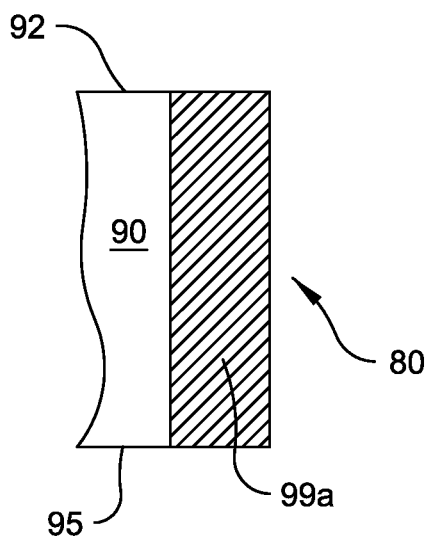
Figure 22C:
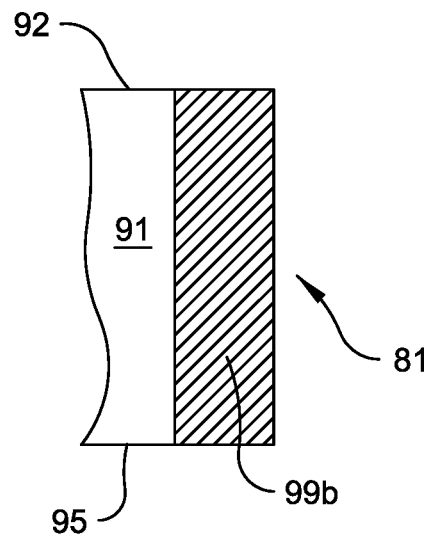
Figure 23A:
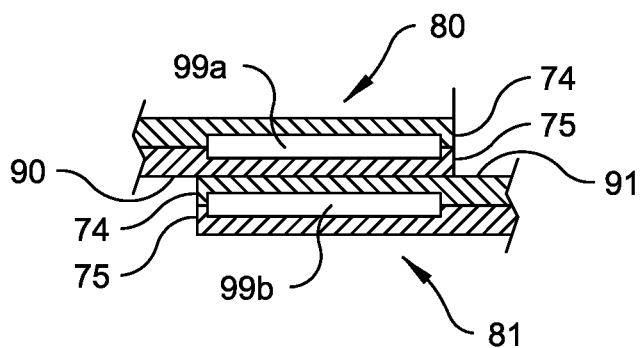
FIG. 23a is an enlarged cross section view illustrating a pair of attachment elements separately embedded within a first side seam and a second side seam so that the first and second side seams are secured without direct contact between the attachment elements in accordance with an embodiment of the invention.
Figure 23B:
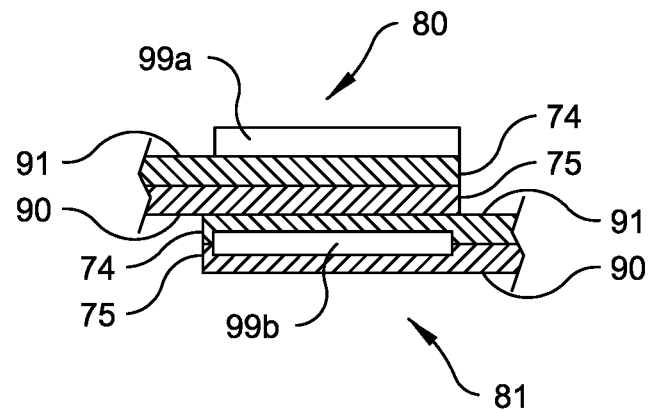
FIG. 23b is an enlarged cross section view illustrating a pair of attachment elements wherein one attachment element is disposed along an outward facing surface of a first side seam and another attachment element is embedded within a second side seam so that the first and second side seams are secured without direct contact between the attachment elements in accordance with an embodiment of the invention.

Referring now to FIGS. 23a and 23b, it may be advantageous in some embodiments for an attachment element 99a, 99b to be embedded between a front panel 74 and a back panel 75. This feature is generally characterized by the front panel 74 and the back panel 75 at least partially enclosing one attachment element 99a or 99b. For example, FIG. 23a shows an attachment element 99a sandwiched between a front panel 74 and a back panel 75 comprising the first side seam 80 and an attachment element 99b sandwiched between a front panel 74 and a back panel 75 comprising the second side seam 81. In another example, FIG. 23b shows only one attachment element 99b sandwiched between a front panel 74 and a back panel 75 comprising the second side seam 81. When only one attachment element 99b is embedded, the other attachment element 99a may be attached to the first side seam 80 along either an inward facing surface 90 as provided in FIG. 22a or an outward facing surface 91 as provided in FIG. 23b. It is understood that the embedded feature shown in FIG. 23b is likewise applicable along only the first side seam 80 rather than only the second side seam 81. The front panel 74 and the back panel 75 may be either adhesively bonded or ultrasonically welded about the perimeter of the attachment element 99a, 99b thereby forming a pocket about the attachment element 99a, 99b.

It may be advantageous in some embodiments for one attachment element 99a to be fixed to either the outward facing surface 91 or the inward facing surface 90 along one side seam 80 and another attachment element 99b to be fixed to either the outward facing surface 91 or the inward facing surface 90 along one side seam 81. For example, FIG. 23c illustrates one exemplary embodiment whereby one attachment element 99a is fixed to the outer surface 91 along one side seam 80 and another attachment element 99b is fixed to the inner surface 90 along another side seam 81.

Proper function of the embodiment in FIG. 22a is facilitated by direct contact between the attachment elements 99a, 99b. The attachment elements 99a, 99b may include, but are not limited to, mechanical operability via a hook-n-loop fastener or magnetic operability via the paired arrangement of magnets or the paired arrangement of a magnet and a magnetically-attractable material.

Figure 23C:
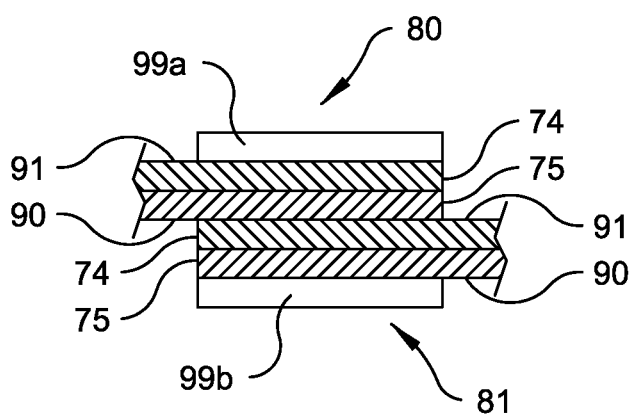
FIG. 23c is an enlarged cross section view illustrating a pair of attachment elements wherein one attachment element is disposed along an outward facing surface of a first side seam and another attachment element is disposed along an inward facing surface of a second side seam so that the first and second side seams are secured without direct contact between the attachment elements in accordance with an embodiment of the invention.

Proper function of the various embodiments in FIGS. 23a-23c is facilitated by indirect contact between attachment elements 99a, 99b. In these embodiments, either the inward facing surface 90 and the outward facing surface 91 directly contact or the inward facing surface 90 or the outward facing surface 91 contact one attachment element 99a, 99b. The attachment elements 99a, 99b may include, but are not limited to, magnetic operability via the paired arrangement of magnets or the paired arrangement of a magnet and a magnetically-attractable material.

Figure 24:
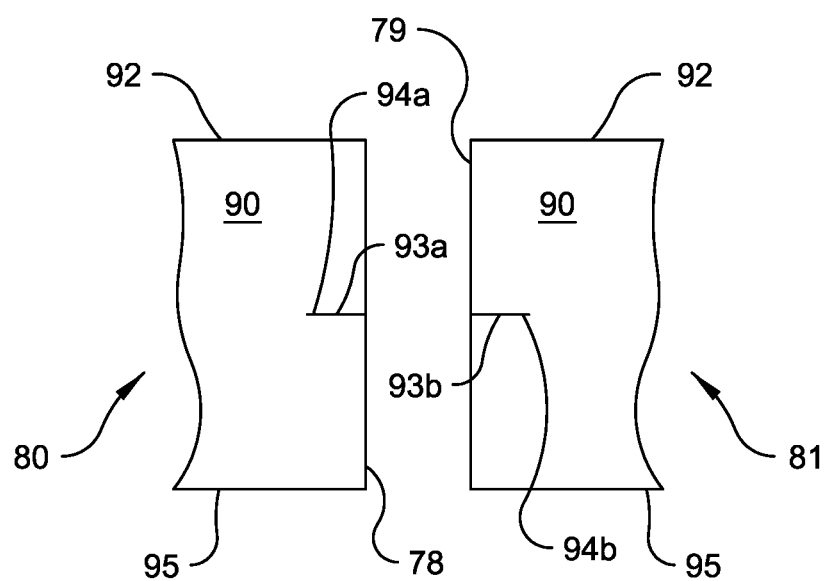
FIG. 24 is an enlarged side view illustrating a pair of attachment elements prior to coupling wherein each attachment element is a slot disposed along a first side seam and a second side seam in accordance with an embodiment of the invention.

Referring now to FIG. 24, the side seams 80, 81 may include attachment elements 93a, 93b for securing and/or re-securing a label 73 to a container 32 whereby the attachment elements 93a, 93b are features of the side seams 80, 81, respectively. The left side seam 80 may include an attachment element 93a comprising a slot or cut that at least partially traverses the side seam 80 beginning at a side edge 78 and terminating at an end 94a. The right side seam 81 may include an attachment element 93b comprising a slot or cut that at least partially traverses the side seam 81 beginning at a side edge 79 and terminating at an end 94b. The attachment features 93a, 93b should be positioned and sized so that the slots are alignable and permit sliding engagement between the side seams 80, 81. In one example, the attachment features 93a, 93b may be horizontal-disposed cuts which partially traverse the centerline between top 92 and bottom 95 of the respective side seams 80, 81.

Referring now to FIGS. 24 and 25a-25c, the side seams 80, 81 are mechanically engaged by sliding the respective attachment elements 93a, 93b into each other so that the attachment element 93a along the side seam 80 traverses a portion of the other side seam 81 and the attachment element 93b along the side seam 81 traverses a portion of the other side seam 80. The result is scissor-like or x-shaped engagement about the attachment elements 93, 93b whereby a lower portion of one side seam 80 overlaps a lower portion of another side seam 81 and oppositely the upper portion of one side seam 80 overlaps an upper portion of another side seam 81. Sliding engage between the side seams 80, 81 is complete then the ends 94a, 94b contact. The depth of overlap for the left side seam 80 onto the right side seam 81 is substantially equal to the length of the attachment element 93a from the side edge 78 to the end 94a. The depth of overlap for the right side seam 81 onto the left side seam 80 is substantially equal to the length of the attachment element 93b from the side edge 79 to the end 94b. In preferred embodiments, the lengths of the attachment elements 93a, 93b are substantially equal.

Figure 25B:
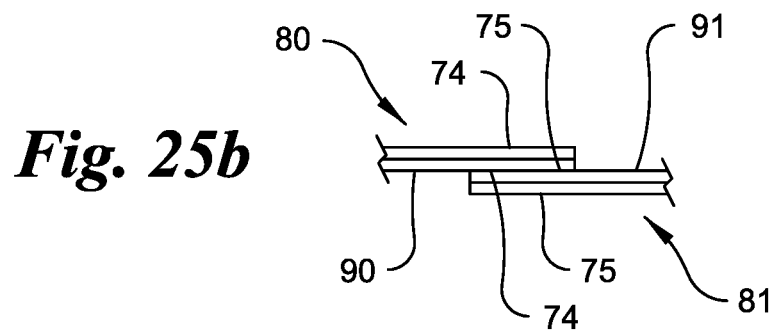
Figure 25A:
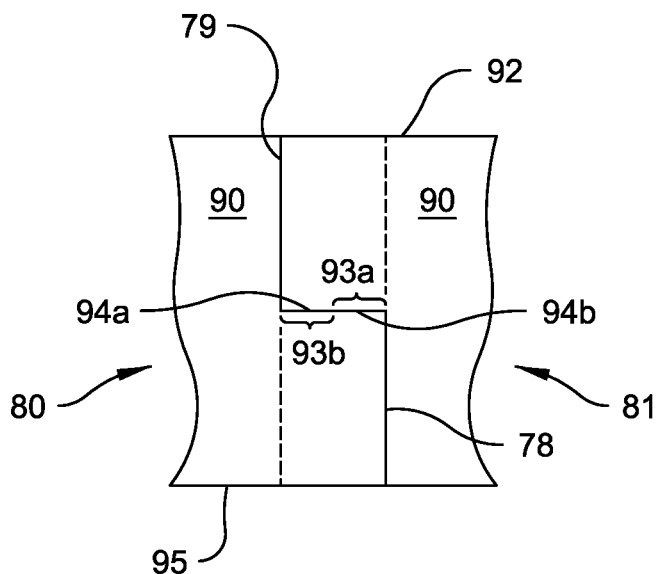
FIG. 25a is an enlarged side view illustrating coupling between a pair of slot-shaped attachment elements separately disposed along a first side seam and a second side seam whereby the attachments elements secure the first and second side seams to one another in accordance with an embodiment of the invention.
Figure 25C:
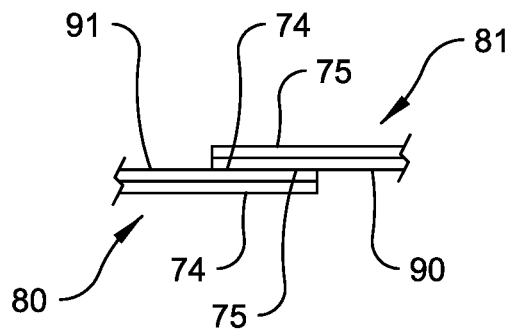

When viewed from the inward facing surface 90 of each side seam 80, 81, a portion of the side seam 81 above the attachment element 93b overlays an equal portion of the side seam 80 above the attachment element 93b and a portion of the side seam 80 below the attachment element 93a overlays an equal portion of the side seal 81 below the attachment element 93a as described in FIGS. 25a-25c.

It is possible in other embodiments when viewed from the inward facing surface 90 of each side seam 80, 81 for a portion of the side seam 81 below the attachment element 93b to overlay an equal portion of the side seam 80 below the attachment element 93b and a portion of the side seam 80 above the attachment element 93a to overlay an equal portion of the side seal 81 above the attachment element 94a.

Figure 26:
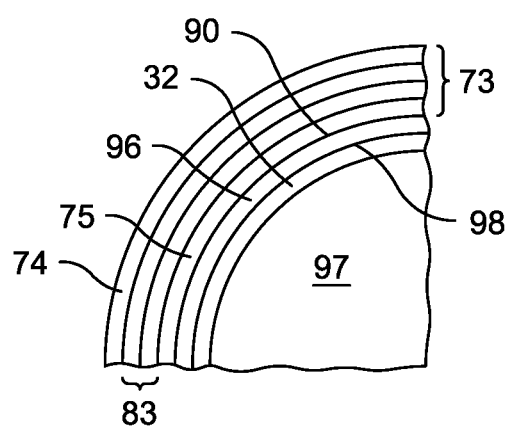
FIG. 26 is an enlarged cross section view illustrating an optional adhesive layer disposed between an inward facing surface along a label and an exterior surface along a container in accordance with an embodiment of the invention.

Referring now to FIG. 26, the front panel 74 and the back panel 75 disposed about a collapsed bottom panel 83 in the first configuration may form a bendable or flexible label-shaped structure permitting mounting onto an exterior surface 98 of a container 32 with consumable product 97 therein. An adhesive 96 may be required in some embodiments disposed between the inward facing surface 90 along the label 73 and the exterior surface 98 along the container 32. The attachments elements 93a, 93b and 99a, 99b may initially secure the label 73 to the container 32 and/or provide a means for re-securing the label 73 to the container 32 after reuse as the receptacle 89 in FIG. 14. In some embodiments, the attachment elements 93a, 93b and 99a, 99b may provide a primary means for securing the label 73 to the container 32 that is be used with or in place of an adhesive 96. In other embodiments, the attachment elements 93a, 93b and 99a, 99b may provide a secondary means for securing the label 73 to the container 32 that complements functionality of an adhesive 96.

Referring now to FIGS. 14-26, the label 73 formed by front panel 74, back panel 75, and bottom panel 83 are disposed in a substantially parallel arrangement in a first configuration and removed from the container 32 having a consumable pet product 97 therein. Removal of the label 73 from the container 32 may require separating the paired arrangement of attachment elements 93a, 93b or 99a, 99b disposed at opposite ends of the label 73, preferably along the side seams 80, 81. Thereafter, the label 73 is configured so that front panel 74 and back panel 75 are separated and bottom panel 83 is expanded to form a receptacle 89 capable of holding the consumable product 97 in a second configuration. Front panel 74 and back panel 75 are separated by applying a force onto each so that front panel 74 and back panel 75 move away from each other between the side seams 80, 81. Thereafter, the receptacle 89 is reconfigured so that front panel 74, back panel 75, and bottom panel 83 are once again disposed in a substantially parallel arrangement. The label 73 may be reattached to the container 32 after the reconfiguring step via the attachment elements 93a, 93b or 99a, 99b. Reattachment is facilitated by placing the label 73 onto the container 32 so that the label 73 generally conforms to the exterior surface 98 of the container 32 and joining the attachment elements 93a, 93b, or 99a, 99b disposed at opposite ends of the label 73. In some embodiments, the adhesive 98 may further permit reattachment. After configuring the label 73 to the receptacle 89 and prior to reconfiguring the receptacle 89 to a label 73, the consumable product 97 may be dispensed from the container 32 into the receptacle 89 thereby permitting a pet to consume the consumable product 97 from the container 32.

As is evident from the explanation herein, the described invention is a transformable label assembly wherein a label has secondary functionality as a receptacle after detachment from a container. Accordingly, the described invention is expected to be applicable as a means for consuming various foods and drink by pets or persons. It is also understood that the various attachment and reattachment means between label and container described for one or more embodiments herein are applicable to other embodiments of the reconfigurable label assembly also described herein.

The description above indicates that a great degree of flexibility is offered in terms of the present invention. Although various embodiments have been described in considerable detail with reference to certain preferred versions thereof, other versions are possible. Therefore, the spirit and scope of the appended claims should not be limited to the description of the preferred versions contained herein.

What is claimed is:

1. An improved reconfigurable label assembly comprising:
   (a) a container being capable of storing a consumable product;
   (b) a front panel;
   (c) a back panel; and
   (d) a bottom panel;
   wherein said front panel, said back panel, and said bottom panel are attached,
   said bottom panel disposed between and substantially parallel to said front panel and said back panel in a first configuration to form a label attached to and being completely separable from said container,
   said label disposed along an outer surface of said container in said first configuration and being configurable to form a receptacle in a second configuration,
   said front panel and said back panel being separable and said bottom panel being expandable to form said receptacle in said second configuration after said label is removed from said container, said receptacle being capable of holding the consumable product,
   said receptacle in said second configuration being configurable to said label in said first configuration after use as said receptacle in said second configuration so that said label in said first configuration is directly reattachable to said container.

2. The improved reconfigurable label assembly of claim 1, further comprising:
   (e) a pair of attachment elements separately disposed at opposite ends of said label in said first configuration so as to cooperate to releasably secure said front panel, said back panel, and said bottom panel to said container in said first configuration.

3. The improved reconfigurable label assembly of claim 2, wherein one said attachment element is disposed along a first side seam and the other said attachment element is disposed along a second side seam, said first side seam and said second side seam overlap when said label is disposed about said container.

4. The improved reconfigurable label assembly of claim 2, wherein said attachment elements are magnetic.

5. The improved reconfigurable label assembly of claim 2, wherein one said attachment element is magnetic and the other said attachment element is magnetically attractable.

6. The improved reconfigurable label assembly of claim 2, wherein said attachment elements comprise a hook-n-loop fastener.

7. The improved reconfigurable label assembly of claim 2, wherein said attachment elements comprise a first slot disposed along a first side seam and a second slot disposed along a second side seam, said slots permit interlock between said first side seam and said second side seam.

8. The improved reconfigurable label assembly of claim 2, wherein said attachment elements facilitate attachment of said front panel, said back panel, and said bottom panel to said container in said first configuration.

9. The improved reconfigurable label assembly of claim 2, wherein said attachment elements facilitate reattachment of said front panel, said back panel, and said bottom panel to said container in said first configuration.

* * * * *